H. L. BREEN.
MACHINE FOR TREATING GRAIN, &c.
APPLICATION FILED APR. 16, 1921.
1,396,621.
Patented Nov. 8, 1921.
3 SHEETS—SHEET 1.
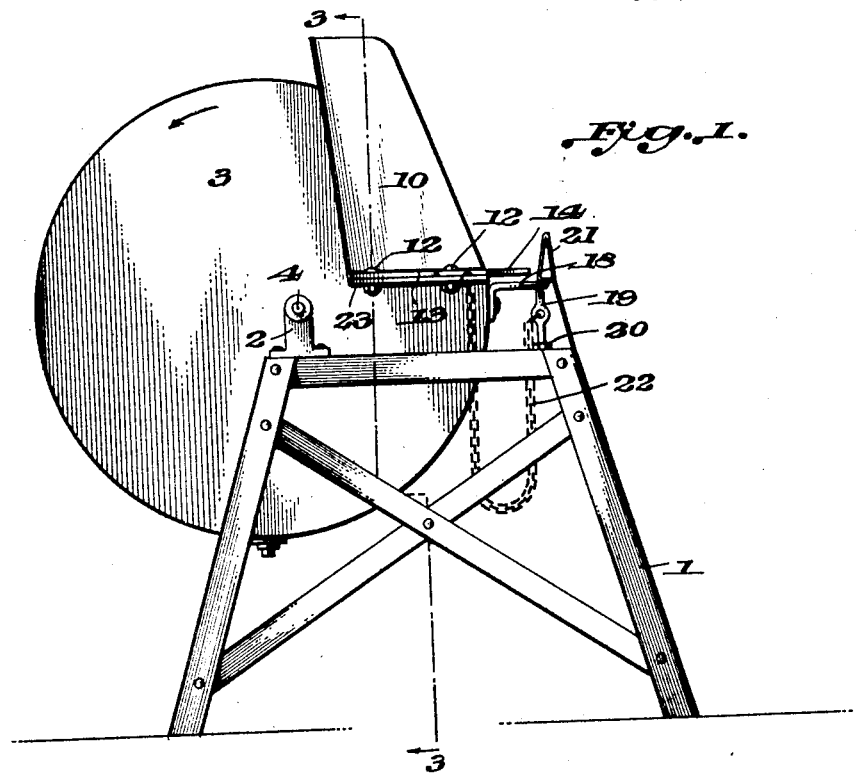
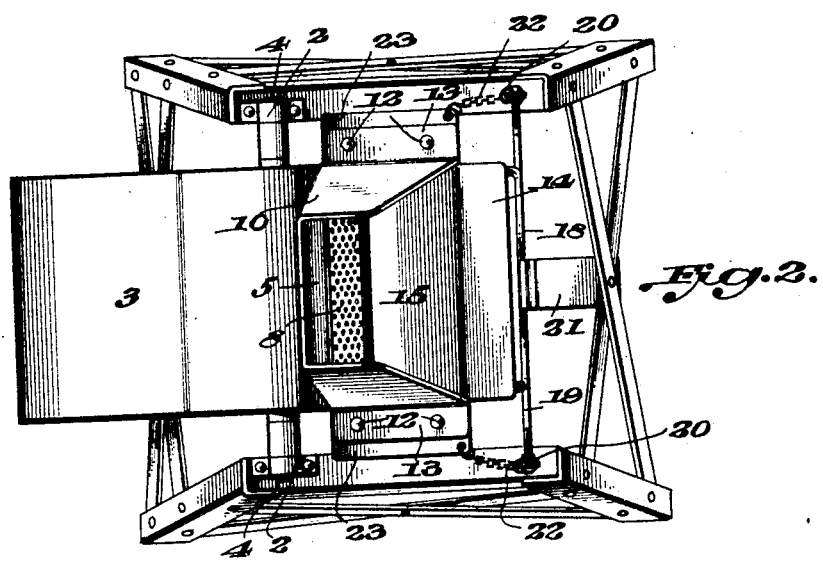

H. L. BREEN.
MACHINE FOR TREATING GRAIN, &c.
APPLICATION FILED APR. 16, 1921.
1,396,621.
Patented Nov. 8, 1921.
3 SHEETS—SHEET 2.
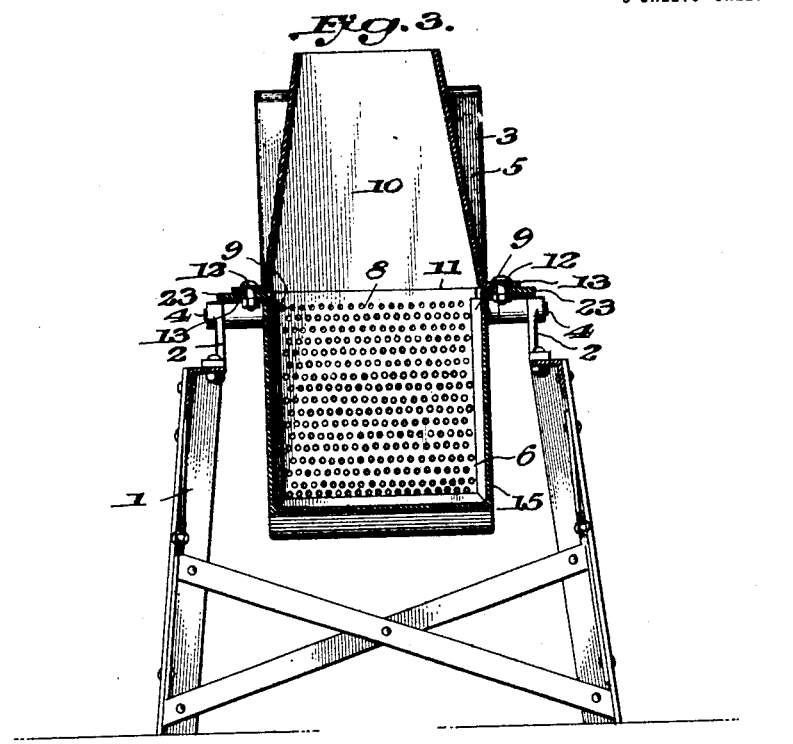
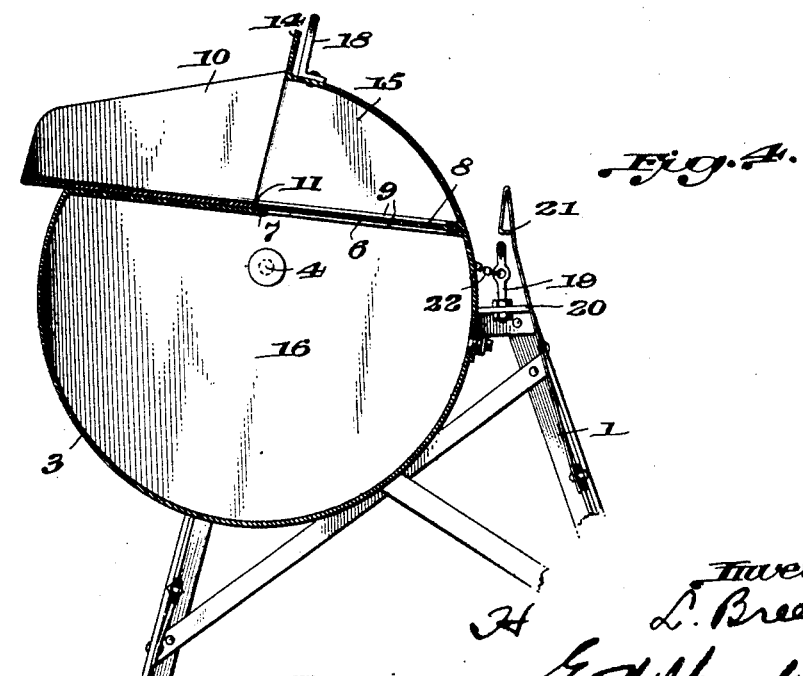

UNITED STATES PATENT OFFICE.

HAROLD L. BREEN, OF HATTON, NORTH DAKOTA.

MACHINE FOR TREATING GRAIN, &c.

1,396,621.

Specification of Letters Patent.  Patented Nov. 8, 1921.

Application filed April 16, 1921. Serial No. 461,898.

*To all whom it may concern:*

Be it known that I, HAROLD L. BREEN, a citizen of the United States, residing at Hatton, in the county of Traill and State of North Dakota, have invented certain new and useful Improvements in Machines for Treating Grain, &c., of which the following is a specification.

This invention relates to machines for treating grain, potatoes, and vegetables with a solution, for instance, formaldehyde, for the purpose of destroying disease germs carried by these products of the soil.

My invention embodies improvements on machines and appliances heretofore used for this purpose whereby the operation of treating the grain or other products is rendered more simple, easier, and efficient.

The invention embodies a drum which is eccentrically mounted for rocking or revolution and is adapted to hold the solution, the drum being provided with a bin or container which is arranged in a novel fashion and is separated from the interior of the drum by a screen to enable the solution to have access to the grain. There is also provided a spout disposed in a novel relationship to the bin and drum to afford means for the discharge of the grain or other product after it has been treated and drained.

The drum is eccentrically mounted in such a fashion that when the bin contains the usual amount of grain or other product, the added weight of such product will insure that the draining position will be on the dead center of the drum. Consequently the drum is so well balanced that even a child can rock the drum to carry out the steps of dipping the grain, draining it, and discharging the grain or other product with the greatest ease and can accomplish as perfect treatment as could be obtained if an adult operated the machine.

In the present machine there is provided a releasable catch and an operating handle coöperating therewith, together with limiting chains or other suitable flexible connections between the drum and the frame whereby the drum may be locked in suitable position for introduction of the grain or other product in the bin to the end that it will be subject to the solution and when the catch is released, the peculiar eccentric mounting of the drum and proportioning of the weights of the solution and grain will result in the automatic rocking or revolution of the drum to draining position so that the second step of the operation is carried out in an automatic manner. After draining has been effected, the operator, with a slight effort, turns the drum to the third position to cause the discharge of the grain or other product from the spout onto the floor or into a sack or receptacle.

Light material such as wild oats, chaff, and the like floats to the top of the solution and can be easily skimmed off.

Other features of my invention are the employment of a removable screen which is held by the spout and may be taken out for purposes of cleaning, and a stop bar coöperating with the handle and the catch.

I am aware that modifications can be resorted to in carrying out my invention without departing from the principle thereof.

In the accompanying drawings:

Figure 1 is a side elevation showing the drum in receiving and treating or dipping position.

Fig. 2 is a plan view thereof.

Fig. 3 is a vertical section on the line 3—3 of Fig. 1.

Fig. 4 is a vertical section showing the drum in draining position.

Figures 5, 6:
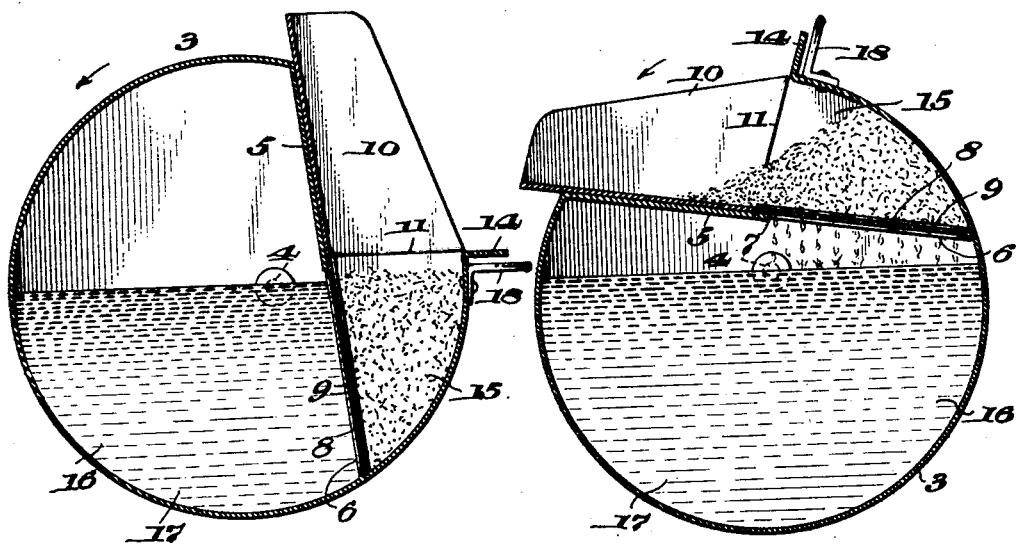
Fig. 5 is a section through the drum showing it in receiving or dipping position.
Fig. 6 is a similar view showing the drum in draining position.

The frame 1 may be of any suitable construction, properly braced and provided with bearings 2. The drum 3 is cylindrical and has stub shafts or trunnions 4 which are journaled in the bearings 2. The stub shafts 4 are eccentrically positioned in relation to the drum 3 in such manner that the drum tends to revolve in the direction of the arrow when free.

A part of the drum is notched or omitted and said drum is provided with a partition 5 which extends partly thereacross, there being provided a large opening 6 extending from the point where the partition terminates at 7, to the opposite side of the drum. This opening 6 is covered by a relatively large screen 8 which is slidably received in lips 9, so that it can be taken out for purposes of cleaning and to afford access to the interior of the drum when desired.

Seated on the partition 5 is a spout 10 whose inner edge 11 abuts the outer edge of the screen 8, thereby retaining the latter in position. The spout has side walls and converges from its inner to its outer ends as shown in Figs. 2 and 3 and it is detachably fastened in position by bolts 12 passing through flanges 13 carried by the spout.

The drum is provided with a shelf or lip 14 which prevents spilling, when the grain is introduced into the bin 15 which is provided by the relative arrangement of the screen 8 and that part of the drum opposite thereto.

The remaining part of the drum, 16, constitutes a solution chamber for containing the formaldehyde or other solution 17.

The drum is provided with a bail-like handle 18 by which it may be rocked.

Secured to the frame 1 is an upright stop-frame 19 which may be adjustable vertically by the provision of screw threads and nuts 20, said frame 19 serving to arrest the drum 3 when the drum is turned backwardly so that the handle 18 rests upon said stop-frame 19. The drum is retained in its backwardly rocking position by a spring latch 21.

Figure 7:
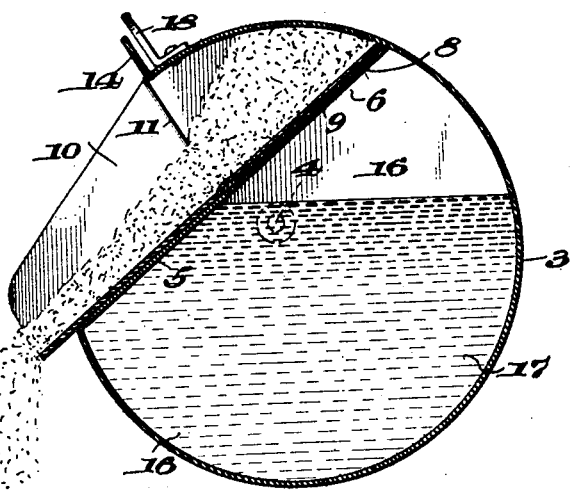
Fig. 7 is a similar view showing the drum in discharging position.

To limit the forward swing of the drum to that of the discharging position shown in Fig. 7, I provide chains or other suitable flexible connections 22 which may be suitably attached to the frame 1, as, for instance, by connection to the stop-frame 19 and also suitably connected to the drum as, for instance, to the flanges 23 to which the spout 10 is bolted. These chains or flexible connections permit the drum to be rocked sufficiently far to discharge the treated and drained grain or other product as shown in Fig. 7 and yet not far enough to allow any of the solution 17 to escape through the screen 8.

In operating the machine the drum is turned back to the position shown in Fig. 1 and latched by the latch 21. The grain, potatoes, or other product to be treated is then placed in the bin 15 where it is immediately subjected to the solution 17 as shown in Fig. 5. The solution having thus been brought into contact with the product, the next step consists in simply releasing the latch 21. When this is done, the eccentric mounting of the drum 3 and the fact that the weight of the fluid 17 in its relationship to the weight of the contents of the bin 15 is such that the drum automatically turns to the draining position shown in Fig. 6, which is the dead center position. This relieves the operator from having to manually turn the drum to effect draining. Draining having been accomplished, the operator grasps the handle 18 and turns the drum to the discharging position shown in Fig. 7 whereupon the grain or other material being treated gravitates through the spout 10 onto the floor or into any suitable receptacle. The flexible connections 22 limit the swing of the drum so that none of the fluid 17 can escape. Inasmuch as the fluid drains back into the chamber 16 when the drum is in the position shown in Fig. 6, only a very minute quantity of the fluid is carried by the treated material and lost and hence the same fluid may be used over and over again. Having discharged the material, the operator rocks the drum back to the position shown in Fig. 1.

I claim:

1. In a machine for treating grain and other agricultural products, an unbalanced or over-weighted drum which, by reason of its unbalanced or overweighted condition, is adapted to automatically turn to draining position when free having a compartment for containing a solution and another compartment in communication therewith for containing grain or other product to be treated.

2. In a machine for treating grain and other agricultural products, an unbalanced or over-weighted drum which, by reason of its unbalanced or overweighted condition, is adapted to automatically turn to draining position when free having a compartment for containing a solution and another compartment in communication therewith for containing grain or other product to be treated, and means for holding the drum in unbalanced position, whereby, when the drum is released it will automatically turn to another position.

3. In a machine for treating grain and other agricultural products, an eccentrically mounted rockable drum which, by reason of its eccentric mounting, is adapted to automatically turn to draining position when free having a compartment for the solution and a compartment for the grain or other agricultural product, said compartments being in communication.

4. In a machine for treating grain and other agricultural products, an eccentrically mounted rockable drum which, by reason of its eccentric mounting, is adapted to automatically turn to draining position when free having a compartment for the solution and a compartment for the grain or other agricultural product, said compartments being in communication, and means for restraining the drum in unbalanced condition to enable grain or the like to be introduced into its compartment and treated, said drum, due to its eccentric mounting, being adapted to automatically turn to bring the grain compartment into draining position when said drum is released.

5. In a machine for treating grain and other agricultural products, the combination with a rockable drum having a solution compartment and a compartment for the grain or other agricultural product, said compartments being in communication, of a removable discharge spout carried by the drum and project beyond the periphery thereof, and a removable screen interposed between the two compartments aforesaid said spout serving to hold said screen in position.

6. In a machine for treating grain and other agricultural products, the combination with an overbalanced rockable drum which, by reason of its unbalanced or overweighted condition is adapted to automatically turn to draining position when free having a solution compartment and a compartment for the grain or other agricultural product, said compartments being in communication, of a stop frame, means carried by the drum adapted to engage said stop frame, and a latch adapted to engage said means to hold the drum in turned back position.

In testimony whereof I affix my signature.

HAROLD L. BREEN.